(No Model.)
P. K. DEDERICK.
BALING PRESS.
No. 330,877. Patented Nov. 24, 1885.
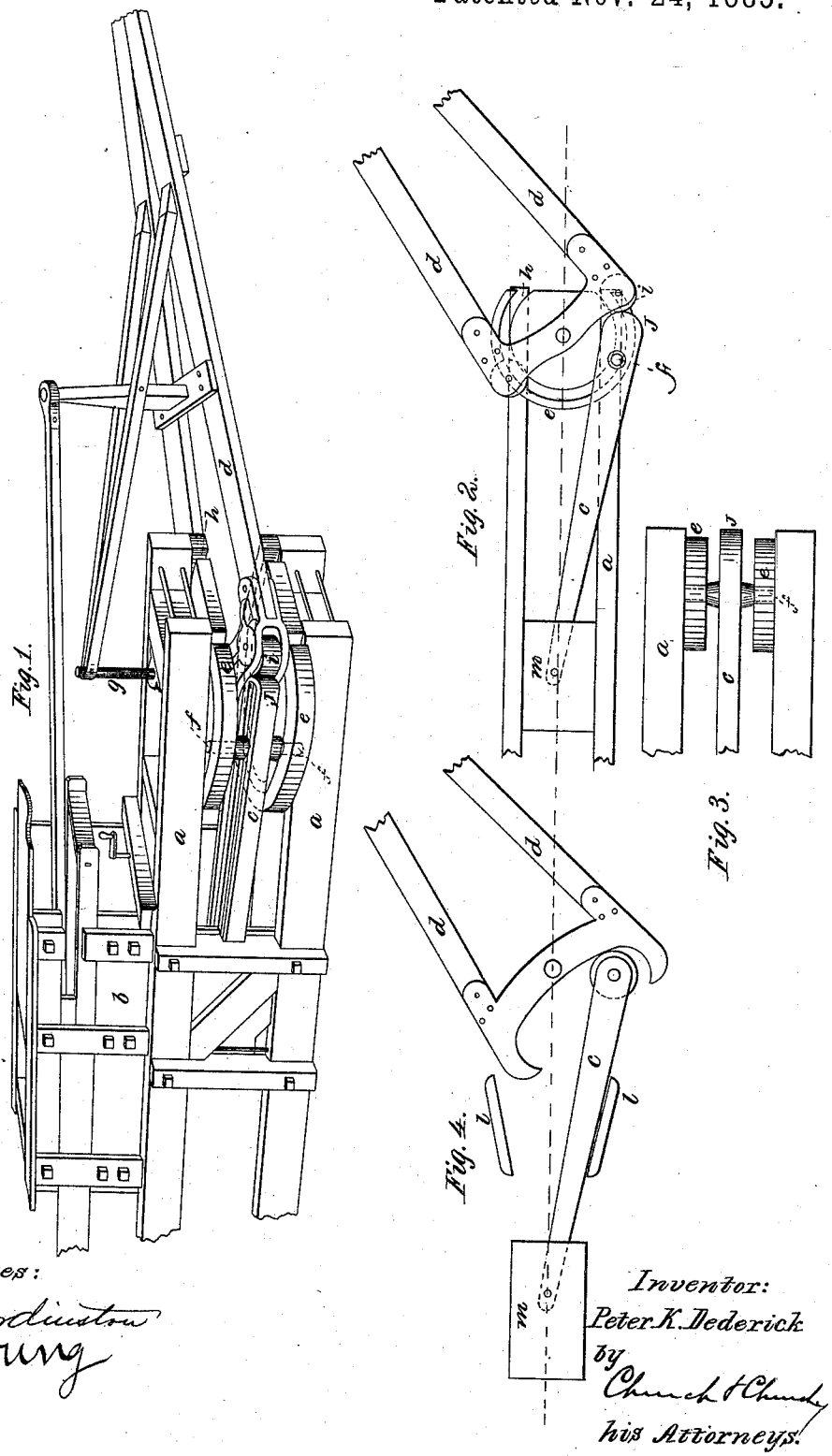

UNITED STATES PATENT OFFICE.

PETER K. DEDERICK, OF LOUDENVILLE, NEW YORK.

BALING-PRESS.

SPECIFICATION forming part of Letters Patent No. 330,877, dated November 24, 1885.

Application filed October 6, 1883. Serial No. 108,302. (No model.)

*To all whom it may concern:*

Be it known that I, P. K. DEDERICK, of Loudenville, in the county of Albany and State of New York, have invented certain Improvements in Baling-Presses, of which the following is a specification.

My invention relates to that class of presses for which Letters Patent were granted to me October 29, 1872, No. 132,566 and No. 132,639, and the various modifications of the same for which Letters Patent have since been granted me, particularly No. 257,153; and it consists, chiefly, in the method of constructing and applying the power.

Figure 1 is a perspective view of my improved power. Figs. 2, 3, and 4 are sectional views.

Similar letters represent similar parts.

$a$ represents the frame of the press; $b$, the hopper; $c$, the traverser or staff; $d$, the horse lever or sweep; $e\,e$, guide-frames for the pitman or staff; $f$, the fulcrum or guide-arm; $g$, the staff or center pin on which the horse-lever is located; $i$, rollers to reduce friction.

It should be observed that all the parts shown are similar to the power shown in No. 257,153, with the exception of the guide-frames $e\,e$ and connections, which are in fact substituted for the swinging fulcrum or guide-arms shown in the patent referred to, and constitute a guide similar to the fulcrum-arms; but may be varied in form or shape to increase or diminish the power, as required, which cannot be done with the swinging arms referred to. The guide-frames $e\,e$ are secured to the frame of the press at top and bottom, as shown, so as to bring their faces toward each other, and at sufficient distance apart to bear against the hub or projection at each side of the pitman $c$, and allow the bearing-arm $f$ to play within the groove or bearing $h$, and the arm $f$ may be provided with either a friction-wheel or slide-shoe for durability, if required. These guide-frames $e\,e$ may be varied in shape and form or located so as to bear on the pitman at different points in any manner, as all that is necessary is a guide or guides that will support the pitman $c$ and hold it in position without the use of swinging arms of No. 257,153, above referred to, and so as to give the required power when operated by the horse-lever. These guides $e\,e$ are of the same form at both sides of the frame, as shown in sectional top view, Fig. 2, in order to double act the pitman, or work it from both sides of the press, and the horse-lever is also of suitable form and location, as shown in Fig. 2, so as to operate the pitman $c$ from both ways, as shown.

I have shown the guides $e\,e$ or groove $h$ in circular form; but they may be varied so as to give more or less velocity and power at different stages of the operation. The pitman $c$ is pivoted to the traverser $m$ in the ordinary manner, and I preferably extend it beyond its bearing $f$, as shown at $j$, in order to increase the power and form a cam in connection with the horse-lever, which operates against its extended end, although extension $j$ may be dispensed with at the expense of some power. The horse-lever $d$ is located on the shaft $g$, which is secured to cross-timbers in the outer end of the frame, as shown, and may also pass through the guides $e\,e$, or be connected to them by means of arms or bolts, so as to form an additional support. This shaft is centrally located in relation to the guides of pitman $c$ so as to operate the pitman both ways, as stated, and at each inner corner may be provided with friction-rollers $i$, to bear against the extended end $j$, or a smooth slide or surface may be substituted for the roller.

Fig. 3 is a sectional side view showing the guide-frames $e\,e$ and pitman $c$ and connections with the horse-lever removed.

In lieu of the guide-bearings shown and described, the end of the horse-lever may be of suitable shape, and the bearings of pitman $c$ be against it, as shown in Fig. 4, and the frame of the press or suitable guides $i$ used to keep it in the required position. The end of the horse-lever in this case could also be varied or made of any suitable form required, so as to increase and diminish velocity and power as required at different stages of the operation, and friction-rollers or slide bearings might either be used, as required, and the pitman $c$ worked both ways, as in previous cases.

The operation of my improved press is similar to Letters Patent No. 257,153 referred, to the bales being formed in sections, and the reaction or expansion of the pressed material reversing the traverser and power after each charge is pressed, and so as to bring the pitman in position to be operated upon by the horse-lever at the opposite side of the frame. The power might be operated from one side, but would be a loss of time as compared with double-acting or working both ways.

Having thus fully described my invention, what I claim, and desire to secure by Letters Patent, is as follows:

1. The combination, with the pitman carrying the bearing arm or shaft, of the guides for the said bearing-arm, and the pivoted horse lever or sweep adapted when vibrated to operate upon the pitman and project it alternately at opposite sides of the press, thus making the power double-acting and giving the pitman the proper direction and power without the use of fulcrum-arms, substantially as described.

2. The combination, with the traverser, of the pitman, the bearing arm or shaft projecting from opposite sides of the pitman, and the guides in which the ends of the said bearing-arm work, whereby the pitman is steadied and guided on both sides without the use of a swinging crank, substantially as described.

3. In a baling-press, the combination, with the horse-lever and the pitman attached at one end to the traverser and free at the other end but projected in the path traversed by the horse-lever, of a guide for engaging the pitman to direct and control the movement of the latter when acted upon by the horse-lever, substantially as described.

PETER K. DEDERICK.

Witnesses:
CYRUS R. DEDERICK,
WILLIAM A. SKINKLE.